(No Model.)
G. G. F. BOSWELL.
FIFTH WHEEL.
No. 460,107. Patented Sept. 29, 1891.
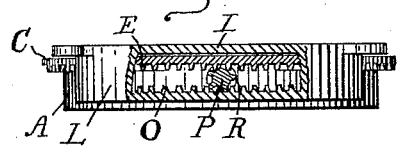
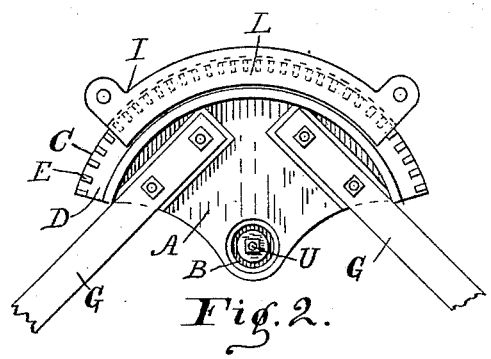
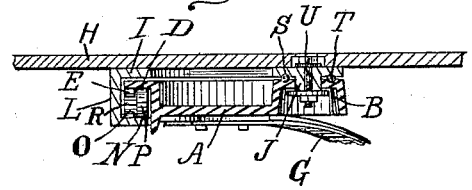
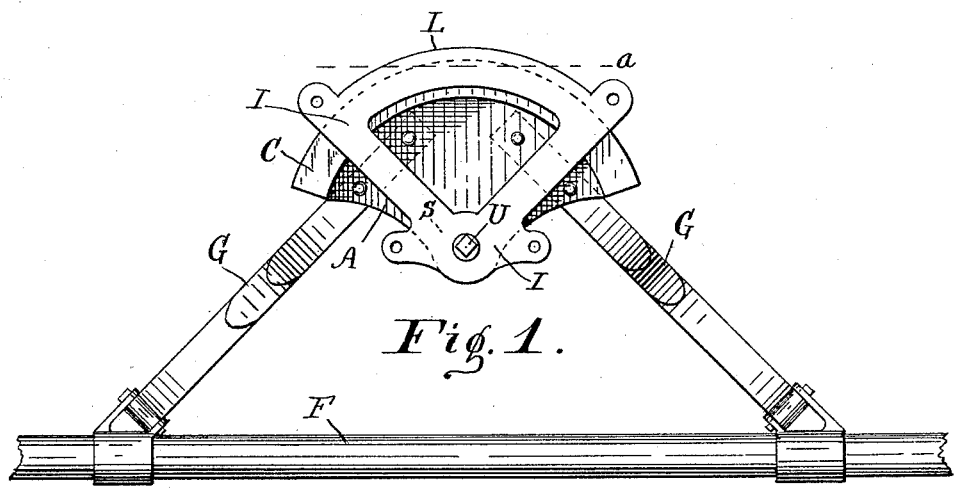
WITNESSES:
A. M. Hood.
O. P. Hood
INVENTOR
George G. F. Boswell.
BY
H. P. Hood,
ATTORNEY.

UNITED STATES PATENT OFFICE.

GEORGE G. F. BOSWELL, OF INDIANAPOLIS, INDIANA, ASSIGNOR OF ONE-HALF TO DAVID A. BOSWELL, OF SAME PLACE.

FIFTH-WHEEL.

SPECIFICATION forming part of Letters Patent No. 460,107, dated September 29, 1891.

Application filed June 29, 1891. Serial No. 397,798. (No model.)

*To all whom it may concern:*

Be it known that I, GEORGE G. F. BOSWELL, a citizen of the United States, residing at Indianapolis, in the county of Marion and State of Indiana, have invented a new and useful Fifth-Wheel for Vehicles, of which the following is a specification.

My invention relates to an improved fifth-wheel for vehicles.

The object of my improvement is to provide in that class of fifth-wheels in which a toothed friction-roller is interposed between that portion of the fifth-wheel which is attached to the axle and the bearing-plate therefor means whereby the roller is sustained by the bearing-plate and the wheel portion is held in engagement therewith, all as hereinafter set forth.

Figure 1 is a plan of the upper side of the fifth-wheel mounted on the front axle of a vehicle. Fig. 2 is a plan of the under side of the fifth-wheel. Fig. 3 represents a vertical section. Fig. 4 represents a section at *a*, Fig. 1.

In the drawings, A represents the fifth-wheel, consisting of a semicircular casting having a central socket B and a peripheral flange C, provided on its under side with a plane surface D and a series of cog-teeth E. Wheel A is attached to the forward axle F of a vehicle by means of springs G G, which are rigidly secured to the wheel at one end and are attached to the axle at the other end by means of suitable clips.

Secured to the under side of the body H of the vehicle is a plate I, having a central hub J, adapted to enter the socket B of wheel A, and a flange L, adapted to embrace the outer edge of said wheel and having a plane surface N and a series of cog-teeth O, the arrangement being such that the plane surfaces D and N, and the cog-teeth of the wheel and plate are opposed to each other and are separated a sufficient distance to receive between them a friction-roller P, having a portion of its face solid and the remainder formed into a series of cog-teeth R, which intermesh with the teeth E, and the roller being sustained by the plate, which is attached to the body of the vehicle, and the rim of the wheel resting upon the roller. A circular groove S surrounds the hub J, and a series of hardened steel balls T are arranged in this groove between the wheel A and the plate I, which are connected so as to turn one upon the other by a bolt U.

In operation, when the axle stands at right angles to the line of movement of the vehicle the friction-roller P is in a central position between the ends of the plate I. When the axle is turned to one side, the friction-roller moves in the same direction as the fifth-wheel, and thus supports the outer edge of the wheel and prevents it from tilting downward. The roller, being compelled by the intermeshing of teeth to move always in unison with the wheel, cannot get out of its relation thereto.

I claim as my invention—

In a fifth-wheel for vehicles, the combination of the semicircular wheel mounted on the axle of the vehicle and having on its under side the concentric plane surface and the corresponding series of cog-teeth E, the plate mounted on the body of the vehicle and having the depending flange L, provided on its upper surface with the plane surface N, the corresponding cog-teeth O, said wheel and plate being pivotally connected so as to turn one upon the other, and the friction-roller provided with cog-teeth and mounted upon the plate beneath the wheel, as and for the purpose set forth.

GEORGE G. F. BOSWELL.

Witnesses:
  H. P. HOOD,
  A. M. HOOD.